US009176856B2

(12) United States Patent
Tune

(10) Patent No.: US 9,176,856 B2
(45) Date of Patent: Nov. 3, 2015

(54) DATA STORE AND METHOD OF ALLOCATING DATA TO THE DATA STORE

(71) Applicant: ARM Limited, Cambridge (GB)

(72) Inventor: Andrew David Tune, Sheffield (GB)

(73) Assignee: ARM Limited, Cambridge (GB)

( * ) Notice: Subject to any disclaimer, the term of this patent is extended or adjusted under 35 U.S.C. 154(b) by 196 days.

(21) Appl. No.: 13/936,749

(22) Filed: Jul. 8, 2013

(65) Prior Publication Data

US 2015/0012719 A1    Jan. 8, 2015

(51) Int. Cl.
*G06F 12/02* (2006.01)
*G06F 12/08* (2006.01)

(52) U.S. Cl.
CPC ........ *G06F 12/0223* (2013.01); *G06F 12/0895* (2013.01); *G06F 12/0864* (2013.01); *G06F 12/0891* (2013.01); *Y02B 60/1225* (2013.01)

(58) Field of Classification Search
CPC ............ G06F 12/0864; G06F 12/0891; G06F 12/0895; Y02B 60/1225
USPC .................................................. 711/118–146
See application file for complete search history.

(56) References Cited

U.S. PATENT DOCUMENTS

| | | | |
|---|---|---|---|
| 5,978,888 A | 11/1999 | Arimilli et al. | |
| 2002/0029321 A1 | 3/2002 | Ebeshu et al. | |
| 2003/0005230 A1 | 1/2003 | Solomon et al. | |
| 2005/0044317 A1 | 2/2005 | Rivers | |
| 2006/0090034 A1 | 4/2006 | Ishihara et al. | |
| 2008/0046652 A1 | 2/2008 | Knoth et al. | |
| 2008/0244170 A1 | 10/2008 | Pani | |
| 2009/0006756 A1 | 1/2009 | Donley | |
| 2009/0031082 A1 | 1/2009 | Ford et al. | |
| 2011/0219188 A1* | 9/2011 | Blumrich et al. | 711/119 |
| 2012/0054443 A1 | 3/2012 | Nakra | |
| 2013/0036270 A1 | 2/2013 | Dreslinski et al. | |
| 2014/0075118 A1 | 3/2014 | Biswas et al. | |
| 2014/0237191 A1* | 8/2014 | Dong | 711/135 |
| 2014/0289477 A1* | 9/2014 | Abali et al. | 711/136 |

OTHER PUBLICATIONS

International Search Report and Written Opinion of the International Searching Authority dated Oct. 7, 2014 in PCT/GB2014/051990, 8 pages.
Gupta et al., "Reducing Memory and Traffic Requirements for Scalable Directory-Based Cache Coherence Schemes", ICPP 1990: Proceedings of the '90 Int'l. Conf. on Parallel Processing, (1990), 10 pages.
Calder et al., "Predictive Sequential Associative Cache", Proceedings of the Second IEEE Symposium on High-Performance Computer Architecture, (Feb. 1996), pp. 244-253.
Agarwal et al., "Column-Associative Caches: A Technique for Reducing the Miss Rate of Direct-Mapped Caches", Proceeding ISCA '93 Proceedings of the $20^{th}$ Annual Int'l. Symp. on Computer Architecture, ACM (1993), 12 pages.
Batson et al., "Reactive-Associative Caches", Conf. on Parallel Architectures and Compilation, (2001), 12 pages.

(Continued)

*Primary Examiner* — Ryan Bertram
(74) *Attorney, Agent, or Firm* — Nixon & Vanderhye P.C.

(57) ABSTRACT

A data store has a data array for storing data values and a tag array for storing tag values for tracking which data values are stored in the data array. The associativity of the data array is greater than the associativity of the tag array. This means that fewer tag entries need to be accessed on each data access than in a conventional data store, reducing power consumption.

18 Claims, 11 Drawing Sheets

(56) References Cited

OTHER PUBLICATIONS

Hallnor et al., "A Fully Associative Software-Managed Cache Design", Proceedings of the 27$^{th}$ Annual Int'l. Symp. on Computer Architecture, (Jun. 2000), pp. 107-116.

González et al., "Eliminating Cache Conflict Misses Through XOR-Based Placement Functions", Proceeding ICS '97 Proceedings of the 11$^{th}$ Int'l. Conf. on Supercomputing, (1997)m pp. 76-83.

Bodin et al., "Skewed Associativity Improves Program Performance and Enhances Predictability", IEEE Transactions on Computers, vol. 46, No. 5, (May 1997), pp. 530-544.

Hasegawa et al., "SH3: High Code Density, Low-Power", IEEE MICRO, vol. 15, No. 6, (Dec. 1995), pp. 11-19.

Zhang et al., "A Way-Halting Cache for Low-Energy High-Performance Systems", ACM Transactions on Architecture and Code Optimization, vol. 2, No. 1, (Mar. 2005), pp. 34-54.

Park et al., A Novel Tag Access Scheme for Low Power L2 Cache, Design, Automation & Test in Europe Conference & Exhibition, (2011), 6 pages.

Yang et al., "Energy Efficient Frequent Value Data Cache Design", Proceedings of the 35$^{th}$ Annual Int'l. Symp. on Microarchitecture, (Dec. 2000), 11 pages.

Villa et al., "Dynamic Zero Compression for Cache Energy Reduction", Proceedings of the 33$^{rd}$ Int'l. Symp. on Microarchitecture, (Dec. 2000), 7 pages.

Min et al., "Location Cache: A Low-Power L2 Cache System", Low Power Electronics and Design, ISLPED '04. Proceedings of the 2004 Int'L. Symp. on Low Power Electronics and Design, (2004), pp. 120-125.

Seznec, "Decoupled Sectored Caches: Conciliating Low Tag Implementation Cost", ACM SIGARCH Computer Architecture News, vol. 22, No. 2, IEEE Computer Society Press, (1994), 11 pages.

\* cited by examiner

Table 1 Example RAM read savings (bits)

| | | Tag | Pointer | Total tag array | Valid (tags+data) | pLRU | Dirty | Total overhead | Data | Total |
|---|---|---|---|---|---|---|---|---|---|---|
| Conventional 16-way cache | Hit | 20 | 0 | 20 x 16 = 320 | 16 | 16 | 16 | 388 | 512 (hit data) | 900 |
| | Replacement (assume 100% dirty data) | 20 | 0 | 20 x 16 = 320 | 16 | 16 | 16 | 388 | 512 (victim) | 900 |
| | Total (@50% hit rate) | | | | | | | 388 | 512 | 900 |
| 16/4 asymmetric associative cache | Hit | 18 | 2 | 20 x 4 = 80 | 4+16=20 | 4 | 4 | 128 | 512 (hit data) | 640 |
| | Replacement (assume 100% dirty data) | 18 | 2 | 20 x (4 + ¾) = 95 | 4+16=20 | 4 | 4 + (4 x ¾) = 7 | 146 | 512 (victim) | 658 |
| | Total (@50% hit rate) | | | | | | | 137 | 512 | 649 |
| Saving vs conventional cache | | | | | | | | 251 (65%) | | 251 (28%) |

Assumptions: The tag array has associativity of 4 and the data array has associativity of 16 and there are 20 tag bits would be required in the comparable conventional cache. There are 4 tag RAMs, which each contain one tag, pointer and dirty bit per tag and there is a separate valid RAM which contains the valid flags and pLRU state for all of the tags that could represent the data set. Ignore tag conflicts. 64-byte data blocks.

FIG. 9

DATA STORE AND METHOD OF ALLOCATING DATA TO THE DATA STORE

BACKGROUND OF THE INVENTION

1. Field of the Invention

The present invention relates to the field of data processing. More particularly, the invention relates to a data store for storing data and a method of allocating data to the data store.

2. Background to the Invention

A data processing apparatus may have a data store for storing data, such as a cache for example. It is reasonably common for a data store such as a cache to be organised in a "set-associative" manner, which means that a data value associated with a particular memory address can only be stored in a limited set of locations within the data store, with that set of location being selected based on the address of the data value. To keep track of which data values are stored in which locations, each data storage location typically has a corresponding tag storage location for storing a tag value indicating a portion of the address of the data value stored in the data storage location. When searching the data store for a data value identified by a target address, the data store searches all the possible tag locations corresponding to the set of data locations which could store the data value, and if one of these tag locations stores a tag value matching the target address, then the data value is accessed from this tag location. Since there is a one-to-one mapping between data entries in the data store and tag entries in the tag store, it is easy to locate the required data location once the corresponding tag has been found.

However, searching through the set of tag locations costs energy. The present technique seeks to provide a data store which is more energy efficient than a conventional data store.

SUMMARY OF THE INVENTION

Viewed from one aspect, the present invention provides a data store for storing data comprising:

a data array comprising a plurality of data entries for storing data values;

a tag array comprising a plurality of tag entries for storing tag values for tracking which data values are stored in the data array; and control circuitry configured to control allocation of a data value to said data array and a corresponding tag value to said tag array to:

(a) allocate said data value to a selected data entry of a corresponding data set of N data entries of said data array, where N is an integer which is less than the total number of data entries of said data array, said corresponding data set selected based on an address of said data value, wherein said data value cannot be allocated to a data entry not in said corresponding data set; and (b) allocate said corresponding tag value to a selected tag entry of a corresponding tag set of M tag entries of said tag array, where M is an integer and M<N, said corresponding tag set selected based on said address of said data value, wherein said tag value cannot be allocated to a tag entry not in said corresponding tag set; and (c) store in said selected tag entry a pointer identifying which data entry of said corresponding data set is said selected data entry.

In a conventional data store, the associativity of the data array is the same as the associativity of the tag array. This means that a data value having a target address can be allocated to one of a limited set of data entries of the data array selected based on the address. Each data entry has a corresponding tag entry in the tag array, and so the tag value corresponding to the data value can be stored in one of a limited set of tag entries, where the number of tag entries in the tag set is the same as the number of data entries in the data set. To locate a data value in the data array it is necessary to search the entire tag set corresponding to the target address of the data value. However, for any given tag access, only one tag entry at most will match the target address, and the accesses to other tag entries in the set waste power and increase access time. Therefore, increasing tag associativity is costly in terms of power consumption and access latency.

A possible solution to this problem might be to reduce the associativity of both the data array and the tag array, so that fewer tag locations need to be searched for each tag access. However, for the data array a greater associativity is generally desirable for performance reasons, because this reduces the likelihood that all the possible locations that could store a new data value are already full when the data value needs to be allocated to the data store. In this case, an old data value would need to be evicted from one of the corresponding set of data entries, and on a subsequent access that data value would need to be fetched from a further level data store or memory and reallocated to the data store. This increases access latency. Therefore, reducing the associativity of both the data array and tag array may reduce processing performance.

To address these problems, the present technique provides a data store with a data array and a tag array in which the associativity of the tag array is less than the associativity of the data array. That is, when a data value is allocated to the data store by control circuitry, the data value can be placed in any of a corresponding data set of N data entries and cannot be allocated to a data entry which is not in that set. On the other hand, the corresponding tag value can only be placed in one of a corresponding tag set of M tag entries of the tag array, where M is less than N. As there is no longer a one-to-one mapping between data entries and tag entries, a pointer is stored in the tag entry identifying which data entry of the corresponding data set stores the corresponding data value.

This approach is counter-intuitive since it is conventional for the tag array to have the same logical arrangement as the data array. However, the inventor of the present technique realised that in fact providing a tag array with a smaller associativity than the data array can reduce overall power consumption of the data store because when searching the data store for a given data value, fewer tag entries can store the corresponding tag value and so fewer tag entries need to be searched, and this more than compensates for any additional overhead associated with each tag entry storing a pointer to a corresponding data entry. Also, with this technique power can be saved while still allowing the associativity of the data array to be maintained.

The data array and tag array may be implemented as separate memories, or within a common memory storing both the data values and the corresponding tag values.

As the number of tag entries per tag set is smaller than the number of data entries per data set, a greater number of tag sets may be provided than data sets, so that enough tag values corresponding to the data values may be stored. For example, the tag array may comprise Y tag sets of M tag entries and the data array may comprise Z data sets of N data entries, where Y and Z are integers and Y is greater than Z. For example, each tag set may correspond to a smaller range of addresses than each data set so that the overall address coverage of the tag sets is equivalent to the overall address coverage of the data sets.

In some examples, the total number of tag entries may be greater than the total number of data entries, such that (Y×

M)≥(Z×N). This can be useful to help reduce collisions where accesses corresponding to different addresses are competing for the same tag set. By providing additional tag sets of tag entries, the number of conflicts can be reduced and hence hit rate in the data store can be improved. To make mapping of addresses to data sets and tag sets more convenient, it can be useful for the ratio between the number of data entries and the number of tag entries to be a power of two, such as two or four.

In response to an access request for accessing a target data value from the data array, the control circuitry of the data store may perform a first tag lookup for reading the tag values from each of the corresponding tag set of M tag entries. The corresponding tag set is selected based on the target address specified by the access request. As the tag set is smaller than the data set, it is not necessary to read N tag entries corresponding to the size of the corresponding data set, so that power consumption is reduced. Based on the tag values read from the tag set corresponding to the target address, the control circuitry can determine whether the data array stores the target data value. The access request may be a read access request for reading a data value from the data store or a write access request for writing a data value to the data store.

If one of the read tag values in the read tag set of tag entries corresponds to a tag portion of the tag address, then the target data entry which stores the required data value can be determined using at least a portion of the target address and the pointer of the tag entry which stores the corresponding tag value. The target data value can then be accessed in the target data entry. Hence, the pointer helps to locate the data value in the data array. It is possible that other parameters, such as which tag entry stores the corresponding tag value, may also be used to determine the target data entry.

The access to the target data entry to obtain the target data value may occur in a processing cycle following the processing cycle in which the first tag lookup is performed to read the tag values. By delaying the data access for a cycle, the tag access can be completed beforehand so that it is already known which data entry stores the required data value. This means it is not necessary to read all the data entries of the corresponding data set, and so power consumption can be reduced.

If none of the read tag values from the corresponding tag set corresponds to the tag portion of the target address, then the control circuitry may allocate a new data value to one of the N data entries of the corresponding data set and allocate the tag portion to one of the M tag entries of the corresponding tag set, with the pointer to the selected data entry being stored in the selected tag entry. The new data value may need to be fetched from a further data store such as a higher level cache or a memory.

When a new data value is allocated to the data store, another data value may have to be evicted from the data store. If the data value being evicted is dirty then it may need to be written back to a further level data store. If so, then its address may be determined from the corresponding tag value in the tag array. There may be several different tag sets which can store tag values for data values in the same data set, and so it is possible that the tag entry associated with the evicted data value is in a different tag set to the tag set which was read in the first tag lookup to determine whether the target data value was in the data store. If so, then a second tag lookup may be performed to read the tag value corresponding to the data value to be evicted. On the other hand, if the data value being evicted had a corresponding tag entry in the same tag set as the tag set which has already been looked up, then the second tag lookup can be omitted. The second tag lookup does not significantly affect processing performance because it is not on the critical path (whether there has been a tag miss or hit, and on a hit which way stores the required data, has already been determined).

When allocating a data value to the data store, the control circuitry may perform victim selection for selecting the data entry for storing the data value from the N available data entries of the corresponding data set. For example, the victim selection may take account of whether the data values stored in the corresponding data set are clean or dirty, and may preferentially select data entries which contain a clean data value which does not need to be written back to memory. Also, the victim selection may take into account validity information indicating whether data values within corresponding data entries of the data set are valid. If a data value is invalid then the corresponding data entry may be preferentially selected as the victim data entry.

The data store may have a victim selection data array for storing victim selection data for use in the victim selection. For example, the victim selection data may include information for estimating which of the corresponding data set of entries has been least recently used, for use by a least recently used (LRU) or pseudo least recently used (pLRU) victim selection algorithm. For example this information may indicate the order in which data entries have recently been accessed. Other types of victim selection data may include an indication of how frequently particular data entries have been accessed and an indication of whether particular data entries are considered locked down indicating that the data in those data entries cannot be evicted.

In conventional caches, the victim selection data is typically associated with the corresponding tag values and the victim selection data for all the tag entries in the corresponding tag set is checked when determining a victim entry. However, since the tag sets have lower associativity, than the data set in the present technique, considering only the victim selection data for one tag set would reduce the number of data entries which are available for selection, effectively reducing the associativity of the data array, which would harm processing performance. Instead, the control circuitry may perform the victim selection using the victim selection data for a set of victim selection entries corresponding to the entire data set of N data entries, to preserve the performance benefits of the higher associativity data array.

Following a victim selection it is possible that a data entry which was previously associated with a first tag entry now becomes associated with a second tag entry. This may occur if the new data value stored in the data entry corresponds to a different tag set to the previously stored data value. The tag value in the first tag entry does not need to be evicted, and it may be enough simply to mark that tag value as invalid. Hence, over time the tag array may store several tag values which are invalid and do not correspond to valid data values in the data array. This is particularly likely if the tag array has a greater number of tag entries than the data array has data entries. The victim selection processing performed by the control circuitry may take account of these invalid tag values, as they can indicate a partial history of data values which have been evicted from the data array. The invalid tag values can be used to implement a more advanced data store allocation policy.

In some examples, the victim selection may select a particular data entry, and may then select as a corresponding tag entry one of the tag entries of the tag set corresponding to the target address.

In other cases, the victim selection may first select a given tag entry, and then a data entry of the corresponding data set may be selected afterwards. This approach is convenient for several reasons. Firstly, this means that the pointer stored in the selected tag entry can be used to locate the corresponding data entry to be selected for storing the new data value. Secondly, the tag value stored in the selected tag entry can be used to identify the address of any data value already stored in the corresponding data entry, which is useful if that data value needs to be written back to a higher level data store.

In some implementations, each tag entry can point to any of the data entries of a corresponding data set. This provides greatest freedom in the locations at which corresponding data values and tag values can be stored. Regardless of which tag entry in the corresponding tag set stores a particular tag value, the corresponding data value can be stored in any of the data entries of the corresponding data set.

However, in practice it may be more efficient to limit each tag entry to pointing to a subset of the data entries of the corresponding data set. Each tag entry may correspond to a given subset of entries of the corresponding data set. For example, each subset of data entries may comprise N/M data entries. If the data value is stored in a particular subset of data entries of a data set, then the corresponding tag value can only be placed in a tag entry corresponding to that subset. While this approach does provide some limits on allocation which may occasionally cause a conflict for a particular tag entry when there would not have been a conflict for the corresponding data entry, this type of tag conflict is expected to occur rarely. By limiting the number of data entries which can be pointed to by a given tag entry, pointers having fewer bits can be used in the tag array, which over the entire tag array can save a significant amount of storage capacity. Even if tag conflicts occur occasionally, the overall power consumption of the data store can be reduced.

To map a target address to the corresponding data set and corresponding tag set, different hash functions may be used for the data array and the tag array respectively. A first hash function may be applied to a first portion of the address to identify the corresponding data set, and a second hash function may be applied to a second portion of the address to identify the corresponding tag set. The hash functions may be a direct-mapped functions which do not change the address value (i.e. the first and second portions of the address may index directly into a corresponding data set and tag set). Alternatively, a hash function such as an exclusive or (XOR) operation may be used to transform an index portion of the address into an identifier of a data set or tag set.

The first and second portions of the address used for the different hash functions may be the same size or could be different sizes. Typically, if there are a greater number of tag sets than data sets then the second portion used to identify the tag set may be larger than the first portion used to identify the data set. This means that the remaining tag portion stored as the tag value in the tag array would be smaller than would be the case in a conventional data store where the tag associativity is the same as the data associativity. Therefore, in the present technique the tag value itself may have fewer bits than in the conventional data store, compensating for the additional bits representing the pointer of the corresponding data array, so that the total number of bits in each tag entry may be approximately the same as in the conventional data store.

As there is no longer a fixed relationship between tag entries and data entries, separate valid data arrays may be maintained for the data entries and tag entries respectively to track which entries store valid data.

Viewed from another aspect, the present invention provides a data store for storing data comprising:

data array means for storing data, comprising a plurality of data entry means for storing data values;

tag array means for storing tags, comprising a plurality of tag entry means for storing tag values for tracking which data values are stored in the data array means; and control means for controlling allocation of a data value to said data array means and a corresponding tag value to said tag array means to:

(a) allocate said data value to a selected data entry means of a corresponding data set of N data entry means of said data array means, where N is an integer which is less than the total number of data entry means of said data array means, said corresponding data set selected based on an address of said data value, wherein said data value cannot be allocated to a data entry means not in said corresponding data set;

(b) allocate said corresponding tag value to a selected tag entry means of a corresponding tag set of M tag entries means of said tag array means, where M is an integer and M<N, said corresponding tag set selected based on said address of said data value, wherein said tag value cannot be allocated to a tag entry means not in said corresponding tag set; and (c) store in said selected tag entry means a pointer identifying which data entry means of said corresponding data set is said selected data entry means.

Viewed from a further aspect, the present invention provides a method of allocating a data value to a data store comprising a data array comprising a plurality of data entries for storing data values and a tag array comprising a plurality of tag entries for storing tag values for tracking which data values are stored in the data array; the method comprising:

allocating said data value to a selected data entry of a corresponding data set of N data entries of said data array, where N is an integer which is less than the total number of data entries of said data array, and said corresponding data set is selected based on an address of said data value, wherein said data value cannot be allocated to a data entry not in said corresponding data set;

allocating said corresponding tag value to a selected tag entry of a corresponding tag set of M tag entries of said tag array, where M is an integer and M<N, and said corresponding tag set is selected based on said address of said data value, wherein said tag value cannot be allocated to a tag entry not in said corresponding tag set; and storing in said selected tag entry a pointer identifying which data entry of said corresponding data set is said selected data entry.

The above, and other objects, features and advantages of this invention will be apparent from the following detailed description of illustrative embodiments which is to be read in connection with the accompanying drawings.

BRIEF DESCRIPTION OF THE DRAWINGS

FIG. 9 is a table indicating an estimated energy reduction achieved by the data store of the present technique.

DESCRIPTION OF EXAMPLE EMBODIMENTS

Figure 1:
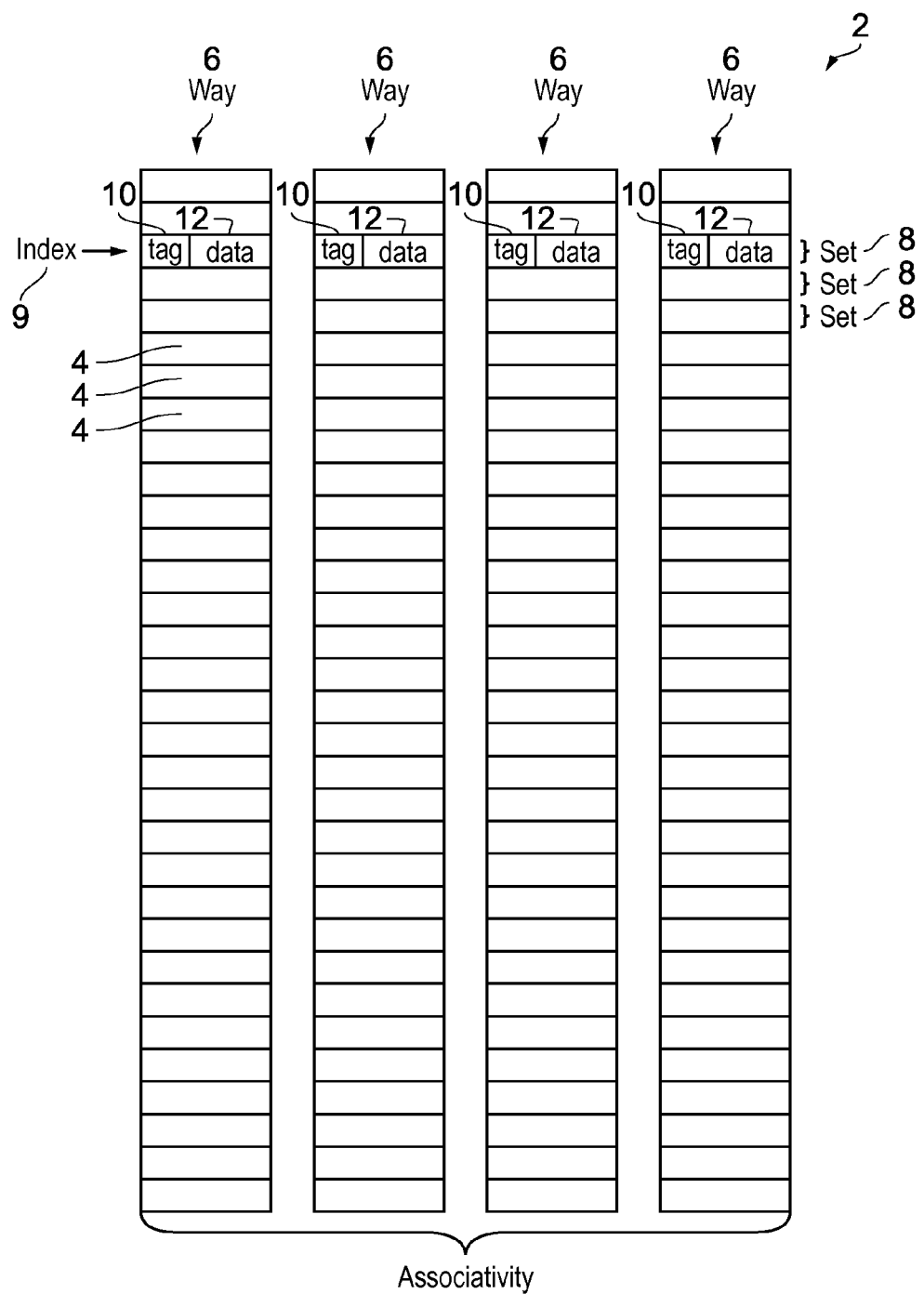
FIG. 1 illustrates an example of the logical arrangement of data entries and tag entries in a conventional data store.

FIG. 1 shows an example of the logical arrangement of a conventional data array 2 comprising a number of entries 4 for storing data values. The entries 4 are arranged logically into ways 6 and sets 8, each set 8 including an entry 4 from each of the ways 6. The number of ways 6 (or the number of entries 4 in each set 8) is referred to as the "associativity" of the data array. It will be appreciated that FIG. 1 merely shows the logical arrangement of the entries 4, and the physical arrangement of the entries 4 may be different. For example, "neighbouring" entries of the same set 8 or the same way 4 may in practice be arranged at separate physical locations in a memory device.

Each data value to be stored to the data array 2 has a corresponding address which is formed of an index portion 9 and a tag portion 10. The data value can be stored in any of the entries 4 of a corresponding set 8 determined based on the index portion 9 of the address of the data value, and cannot be stored in entries 4 of other sets. Since there are several entries 4 which could store the data value, the tag portion 10 of the address is stored to the selected entry 4 along with the data value 12 so that subsequent accesses can determine which entry stores the data value 12. Each entry 4 may also store state information associated with data values 12 such as a valid bit indicating whether data stored in the data array 2 is valid, or a dirty bit indicating whether the data value 12 has been modified compared to the corresponding data value in a higher level data store such as a higher level cache (e.g. L2 or L3 cache) or memory.

FIG. 1 shows the tag value 10 and the corresponding data value 12 being stored in the same entry 4 of the data array 2. In some data arrays, a single memory device stores both the tag values 10 and the data values 12. In other examples, a separate data memory and tag memory may be provided for storing the data values 12 and tag values 10 respectively.

In a conventional data store, there is a one-to-one relationship between the data entries for storing data values 12 and the tag entries for storing tag values 10. Each data entry has a corresponding tag entry. When a data value needs to be accessed from the data store 2, then all the tags 10 of the corresponding set 8 are read and if one of these tags 10 matches the tag portion of the target address then the corresponding data value is returned. However, as only one tag could match the tag portion of the target address, the other tag reads have been unnecessary and these simply waste power and increase access time. The greater the number of entries in a set 8, the greater the number of wasted tag reads and hence the greater the power consumption. While it would be possible to reduce the associativity of the data store 2 in order to reduce the number of tags that have to be read, a given amount of associativity is desirable for the data entries to maintain hit rates and processing performance. Therefore, it is usually not desirable to reduce the associativity of the data store 2.

Figure 2:
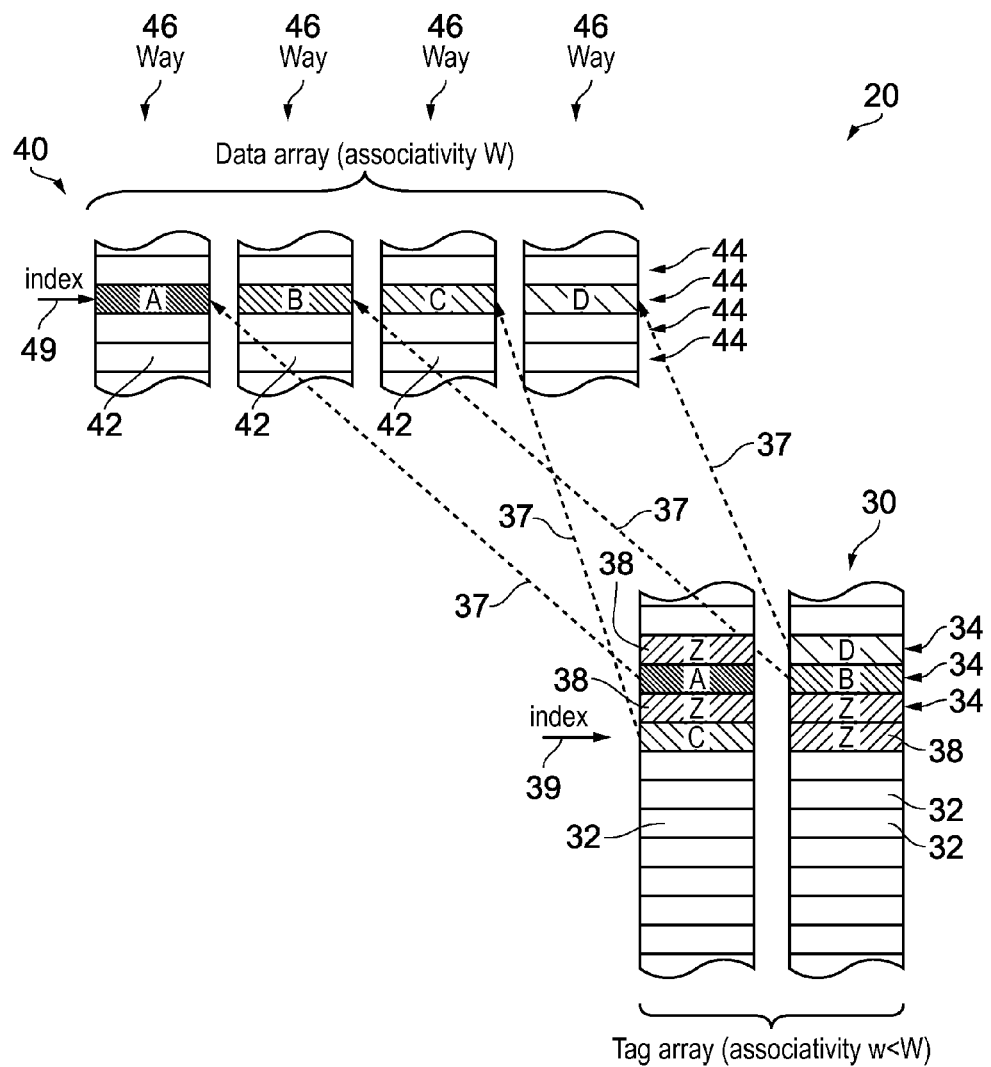
FIG. 2 illustrates an example of the logical arrangement of a data store in which the data array has greater associativity than the tag array.

As shown in FIG. 2, the present technique addresses this issue by providing a data store 20 having a tag array 30 which has lower associativity than the corresponding data array 40.

The data array 40 includes a number of data entries 42 for storing data values. The data entries 42 are arranged logically into data sets 44, each set comprising one entry from each way 46. The associativity of the data array 40 is W, which means that there are W ways 46, or W entries 42 per data set 44. In this example, W equals 4. A data value having a target address can be stored in any of the W entries 42 of the corresponding data set 44, which is selected based on an index portion 49 of the target address.

The tag array 30 has a number of tag entries 32 for storing tag values corresponding to data values in the data array 40. The tag entries 32 are arranged in tag sets 34 each comprising w entries, where w is associativity tag array 30. The associativity w of the tag array 30 is less than the associativity W of the data array 40. In this example, the associativity w of the tag array 30 is 2. Hence, while the data value can be placed in any of W locations within the corresponding data set 44, the corresponding tag value can only be placed in one of w tag entries 32 of the corresponding tag set 34. Again, the tag set 34 is identified based on the index portion 39 of the target address, although the index portion 39 used to identify the tag set 34 may be a different portion of the address to the index portion 49 used to identify the data set 49.

Since there are fewer tag entries per tag set than there are data entries per data set, fewer tags needs to be looked up on each data access. This means that less power is consumed. Nevertheless, the associativity of the data array is maintained to achieve a higher hit rate. Therefore, the asymmetric arrangement of the data array 40 and tag array 30 improves power efficiency without significantly affecting performance (see FIGS. 8 and 9 below for a comparison of the performance and power consumption of the asymmetric data store 20 with that of a conventional symmetric data store as shown in FIG. 1).

Since there is now a one-to-many relationship between tag entries 32 and data entries 42, each tag entry 32 has a pointer 37 which indicates which of the data entries 42 of the corresponding data set 44 stores the corresponding data value. When accessing the data store, the pointer 37 from the tag entry 32 which contains the matching tag value for the target address is used to locate the data entry 42 storing the corresponding data value.

To provide enough space for tag values, the tag array 30 has more tag sets 34 than the data array 40 has data sets 44. Preferably, the total number of tag entries 32 is greater than the total number of data entries 42, for example 2, 4 or 8 times as many entries (or some other power of 2 ratio). Providing a greater number of tag entries 32 is useful to reduce competition for tag entries. As there are more tag entries 32 than data entries 42, at any one time some of the tag entries may store invalid tag values 38 which do not correspond to a valid data value in the data store 40. The invalid tag entries 38 are indicated with a Z in FIG. 2. The information in the invalid tag entries 38 can be used when performing victim selection as it represents a partial history of past tag accesses.

Figure 3:
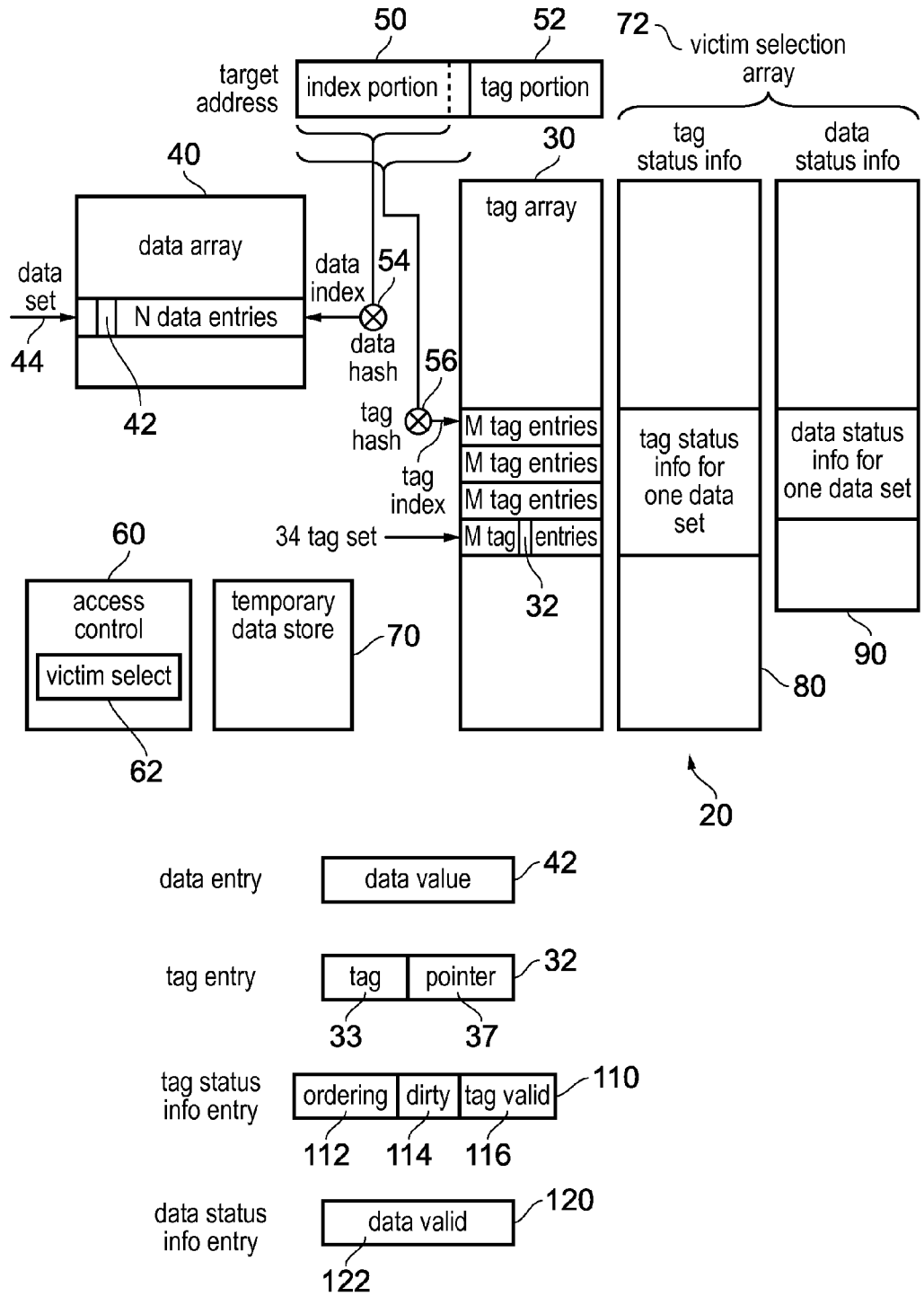
FIG. 3 illustrates an example of a data store according to the present technique.

FIG. 3 shows an example illustrating the data store 20 in more detail. As in FIG. 2, the data store 20 has a data array 40 and a tag array 30 and the associativity of the data array 40 is greater than associativity of the tag array 30. In this example, the data sets 44 each comprise N data entries while the tag sets 34 each comprise M tag entries, where N is greater than M. The target address has an index portion 50 and a tag portion 52. The index portion 50 is subject to a data hash function 54 to obtain a data index for identifying the data set 44 corresponding to the target address. The index portion 50 is also subject to a tag hash function 56 to generate a tag index for identifying a corresponding tag set 34 for the target address.

The data hash function and tag hash function 54, 56 may be different functions or may be the same function. In some examples, the hash function 54, 56 may simply map the index portion 50 directly to the index of the data or tag set 44, 34, while in other cases the hash function 54, 56 may transform the index portion into a different numeric value, for example using an XOR function with a predetermined constant. The tag hash function 56 may use a greater number of bits of the target address than the data hash function 54 so that the range of addresses corresponding to a given tag set 34 is smaller than the range of addresses corresponding to a data set 44.

The data store 20 also has access control circuitry 60 for controlling access to the data array 40 and tag array 30. The access control circuitry 60 has a victim selection policy 62 for selecting which entries 42, 32 are allocated with data values and tag values. The data store 20 also has a temporary data store 70, such as a bank of registers or memory, for storing temporary values while accesses are being performed. Data can be stored temporarily in the temporary data store 70 to avoid needing to read it from the data store 20 again later on.

The data store 20 has a victim selection array 72 for storing victim selection data used by the victim selection policy 62 for determining which data entry 42 and tag entry 32 should store newly allocated data and tag values. In this example the victim selection array comprises a tag status information array 80 and a data status information array 90. The tag status information array 80 includes a number of tag status entries each corresponding to one of the tag entries 32 of the tag array 30, while the data status information array 90 includes several data status entries each corresponding to one of the data entries 42 in the data array 40.

The lower portion of FIG. 3 shows an example of the information stored in the entries of the various arrays 30, 40, 80, 90. The data entry 42 in the data array 40 stores a data value. The corresponding tag entry 32 in the tag array 30 stores a tag value 33 which represents the tag portion 52 of the address of the corresponding data value. The tag entry also includes a pointer 37 which identifies the corresponding data entry 42 which stores the data value.

The tag status information entry 110 includes ordering information 112 which represents, at least approximately, the order in which various tag entries were accessed. The ordering information 112 is useful for implementing various victim selection policies 62, such as least recently used or pseudo least recently used. The tag status information entry 110 also includes a dirty bit 114 for indicating whether or not the corresponding data value in the data array 40 is clean or dirty. The data value is clean if it has not been modified compared to a data value in a higher level data store, and is dirty if it has been modified. The tag status information entry 110 also includes a tag valid bit indicating whether or not the corresponding tag entry 32 is valid. The tag entry 32 is valid if it corresponds to a valid data value in the data array 40.

The data status information entry 120 includes a data valid bit 122 indicating whether the data value in the corresponding data entry 42 is valid. While FIG. 3 shows a particular arrangement of the victim selection data in the tag and data status information arrays 80, 90, it could also be arranged differently. For example, the dirty bit 114 or ordering information 112 could be in the data status information entry 120 instead of the tag status information entry 112. Also, while FIG. 3 shows separate tag status information and data status information arrays 80, 90, in some embodiments these could be combined in a single array. Also, in some embodiments the tag status information array 80 could be combined with the tag array 30 while the data status information array 90 could be combined with the data array 40. Therefore, there are many ways in which the victim selection data can be arranged.

The tag status information entries and data status information entries 110, 120 are used for the victim selection policy 62 carried out by the access control circuitry 60. Although associativity of the tag array 30 is less than the associativity of the data array 40, the access control circuitry 60 performs victim selection using tag status information and data status information for a number of entries corresponding to an entire data set 44. The tag status information entries 110 of all the tag entries 32 which could point to data entries 42 of the corresponding data set 44 are considered in the victim selection. This ensures that the reduced tag associativity does not affect the ability to allocate data to any location of the data set 44, maintaining the associativity of the data set and hence maintaining hit rates.

Figure 4:
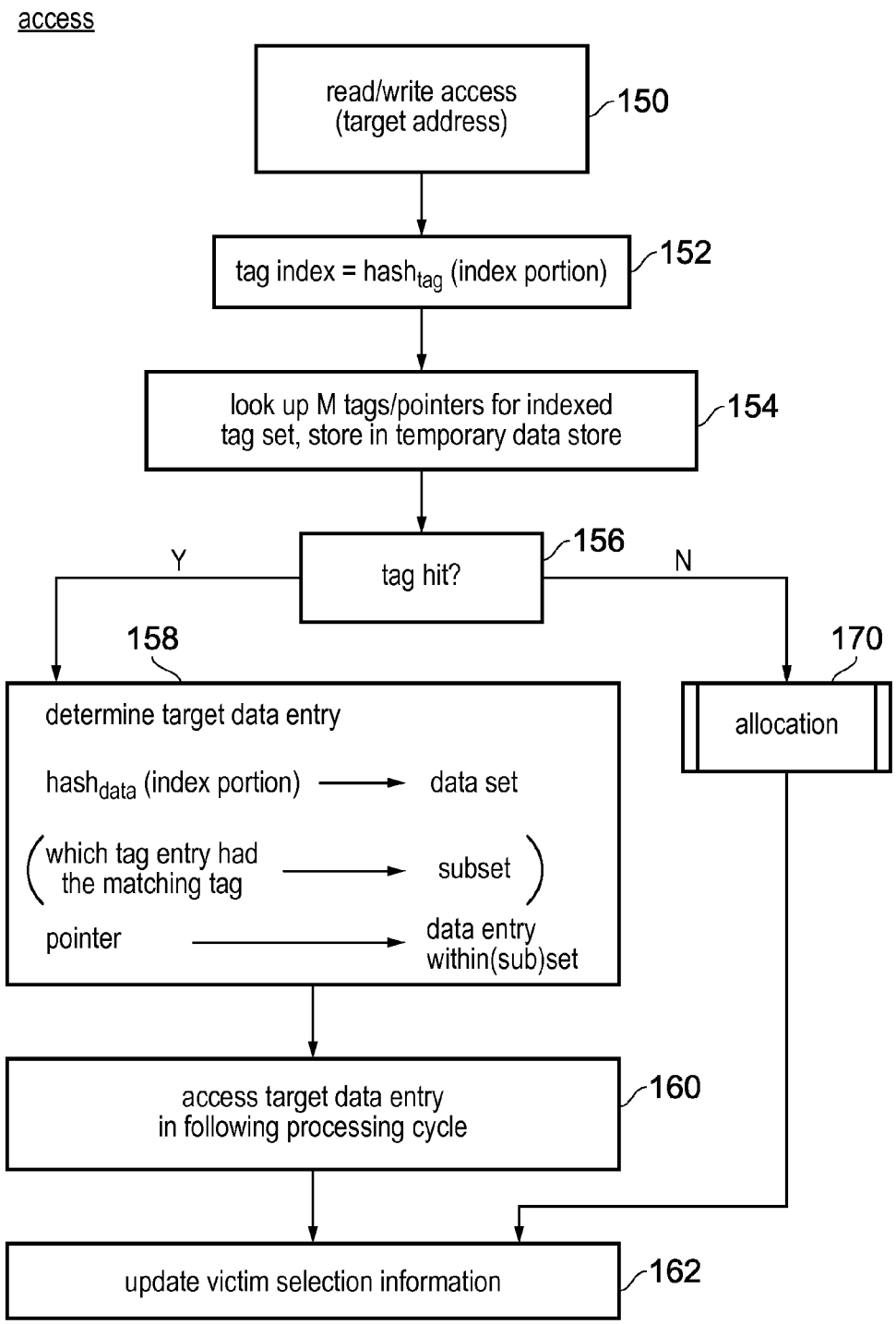
FIG. 4 illustrates a method of accessing data in the data store of FIG. 3.

FIG. 4 shows a method of handling a data access in the data store of FIG. 3. At step 150, a read or write access is received specifying a target address of a data value to be read or to be written to the data store 20. At step 152 the access control circuitry 60 obtains a tag index by applying the tag hash function 56 to the index portion 50 of the target address. At step 154 the access control circuitry 60 looks up M tag values and pointers from the tag set 34 identified by the tag index, and stores these tags and pointers in the temporary data store 70. At step 156, the access control circuitry 60 determines whether there has been a tag hit (that is, whether any of the read tags match the tag portion 52 of the target address). If there has been a tag hit, then at step 158 a target data entry is determined using the index portion 50 of the target address and the pointer 37 stored in the tag entry 32 that had the matching tag. The index portion is subject to the data hash function 54 to identify an index of the corresponding data set 44 in the data array 40. The pointer identifies which data entry within that data set 44 stores the required data value. Then at step 160, the access control circuitry 60 accesses the target data entry in a processing cycle following the cycle in which the tags were looked up at step 154. By delaying the data access until the following cycle, it is possible to wait for the result of the tag comparison in steps 154 and 156 before accessing the data array, so that only one data entry 42 needs to be accessed to save power. At step 162, the victim selection information is updated (e.g. the ordering information 112 and dirty bit 114 may need to be updated). Hence, while the conventional cache arrangement shown in FIG. 1 would have looked up N tag locations on each data access (where N is the number of data entries in each data set 8), with the reduced tag associativity of FIGS. 2 and 3 only M tag locations need to be read at step 154, saving power and reducing access time.

If there was a tag miss at step 156 (i.e. none of the M tags read at step 154 matched the tag portion 52 of the target address), then the method proceeds to step 170 where an allocation procedure is performed to allocate the required data value to a data entry 42 of the data store 20 and allocate the corresponding tag value to a tag entry 32. An example of the allocation procedure 170 is shown in more detail in FIGS. 5A and 5B.

Figure 5A:
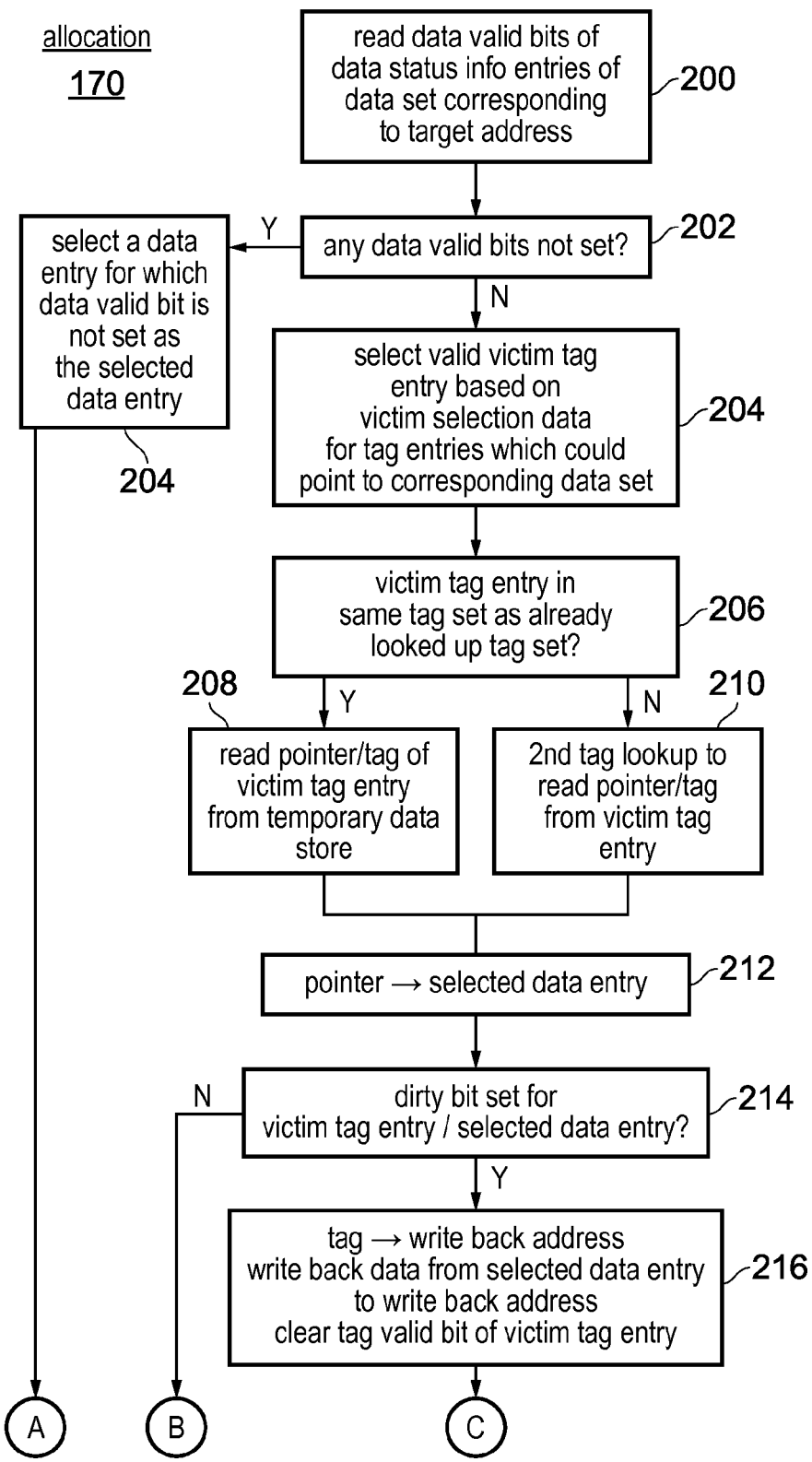
FIGS. 5A and 5B illustrate a method of allocating a data value to the data store.

At step 200 of FIG. 5A, the access control circuitry 60 reads the data valid bits 122 of the N data status entries 120 for data entries 42 of the data set 44 corresponding to the target address. At step 202, the access control circuitry 60 determines whether any of these data valid bits 122 are clear (e.g. equal 0), indicating that the corresponding data value is invalid. If so then at step 204 one of the entries having the valid bit 122 not set is selected for storing the new data value. Hence, invalid data entries 122 are preferentially selected for storing a newly allocated data value, to avoid evicting other data values from the cache where possible.

On the other hand, if all of the data valid bits 122 for the corresponding data set 44 are set (e.g. equal 1), then a data value will need to be evicted from the data store 20 to make way for the new value. At step 204, a victim selection algorithm is performed to select a victim tag entry 32 which corresponds to the data value to be evicted. The victim tag entry is selected from any of the tag entries 32 that can point to the data set 44 corresponding to the target address of the new data value. It is not necessary to select a victim tag entry from the same tag set 34 as the tag set 34 looked up at step 154 of FIG. 4. The victim selection algorithm selects as the victim tag entry a valid tag entry which has the corresponding tag valid bit 116 set, to ensure that the victim will correspond to a valid data entry from which a data value can be evicted. Any suitable victim selection policy may be used to select a particular tag entry 32. For example, a least recently used or pseudo least recently used policy may use the ordering information 112 to determine, at least approximately, which tag entry 32 was accessed least recently (assuming that the least recently used entry is the least likely to be required in future, and so the most suitable for eviction). Alternatively, other victim selection policies 62 may use a not most recently used approximation or a binary approximation to least recently used. Also, the dirty bit 114 may be considered, so that tag entries are preferentially selected if they correspond to clean data, to avoid writebacks of dirty data which will increase access latency.

Whichever technique is used to select the victim tag entry at step 204, the method then proceeds to step 206 where it is determined whether the victim tag entry is in the same tag set 34 as the tag set 34 that was looked up at step 154. If so, then the pointer 37 and tag value 33 of the victim tag entry will already have been stored to the temporary data store 70 at step 154, and so it is not necessary to read them from the tag array 30 again. To save time and energy, the pointer 37 and tag value 33 of the victim tag entry are read from the temporary data store 70 at step 208. On the other hand, if at step 206 it is determined that the victim tag entry is in a different tag set to the already looked up tag set 34, then at step 210 a second tag lookup is performed to read the pointer 37 and tag value 33 from the victim tag entry in the other tag set 34. This second tag lookup is not on the critical path for processing performance because a tag hit/miss has already been determined.

The method then proceeds to step 212, where a selected data entry 42 is determined using the pointer 37 of the victim tag entry. At step 214 the access control circuitry 60 determines whether the corresponding dirty bit 114 is set (e.g. equals 1). If the dirty bit 114 is not set, then no writeback is necessary. However if the dirty bit 114 is set, then at step 216 a writeback is performed. The writeback address is identified based on the index portion corresponding to the tag set 34 including the victim tag entry and the tag value 33 read at step 208 or 210, and then the data value from the selected data entry is written to a location in a higher level data store identified by the writeback address. The tag valid bit 116 of the victim tag entry is then cleared to indicate that the tag entry 32 no longer corresponds to valid data in the data array 40.

At this point, a selected data entry has been chosen for storing the newly allocated data value and any data already within that entry has been evicted. Next, a tag entry for storing the corresponding tag value is selected. The method proceeds to step 220 of FIG. 5B, which is performed regardless of whether an invalid data entry was selected at step 204 or an already occupied data entry was selected at step 212. At step 220, the access control circuitry 60 determines whether there is a tag entry within the tag set 34 corresponding to the target address which has its valid bit not set and which could point to the selected data entry. If so, then at step 221 the invalid tag entry 32 is selected as the selected tag entry. Otherwise, then at step 222 an already valid tag entry is selected, any data stored in the corresponding data entry is evicted (and written back if the data is dirty), and then the data valid bit 122 of the corresponding data entry is cleared. However, as there are a greater number of tag entries 32 than data entries 42, it is expected that step 222 will rarely be required and most of the time there would be an invalid tag entry available.

At step 224, the tag portion 52 of the target address and the pointer 37 indicating the selected data entry 42 are written to the selected tag entry 32. At step 226 the tag valid bit 116 corresponding to the selected tag entry 32 is set. If the new data value to be written to the selected data entry differs from a corresponding value stored at a higher level, then the dirty bit 114 is also set. At step 228, the new data value is written to the selected data entry 42 selected at step 204 or 214. Finally, at step 230 the data valid bit 122 of the data status information entry 120 corresponding to the selected data entry is set. The newly stored data value can be made available for use by the process which issued the original access request. The method then returns to step 162 of FIG. 4 where the ordering information 112 of the victim selection information is updated to reflect the recent access.

Hence, providing a tag array with reduced associativity compared to the data array results in a little extra complexity when allocating new values to the cache. However, if the hit rate is reasonably high then allocation will not be required often and the additional overhead incurred occasionally on allocation is greatly outweighed by the power savings gained on every data access from accessing fewer tag entries. Hence, the overall power consumption is reduced.

Figure 5B:
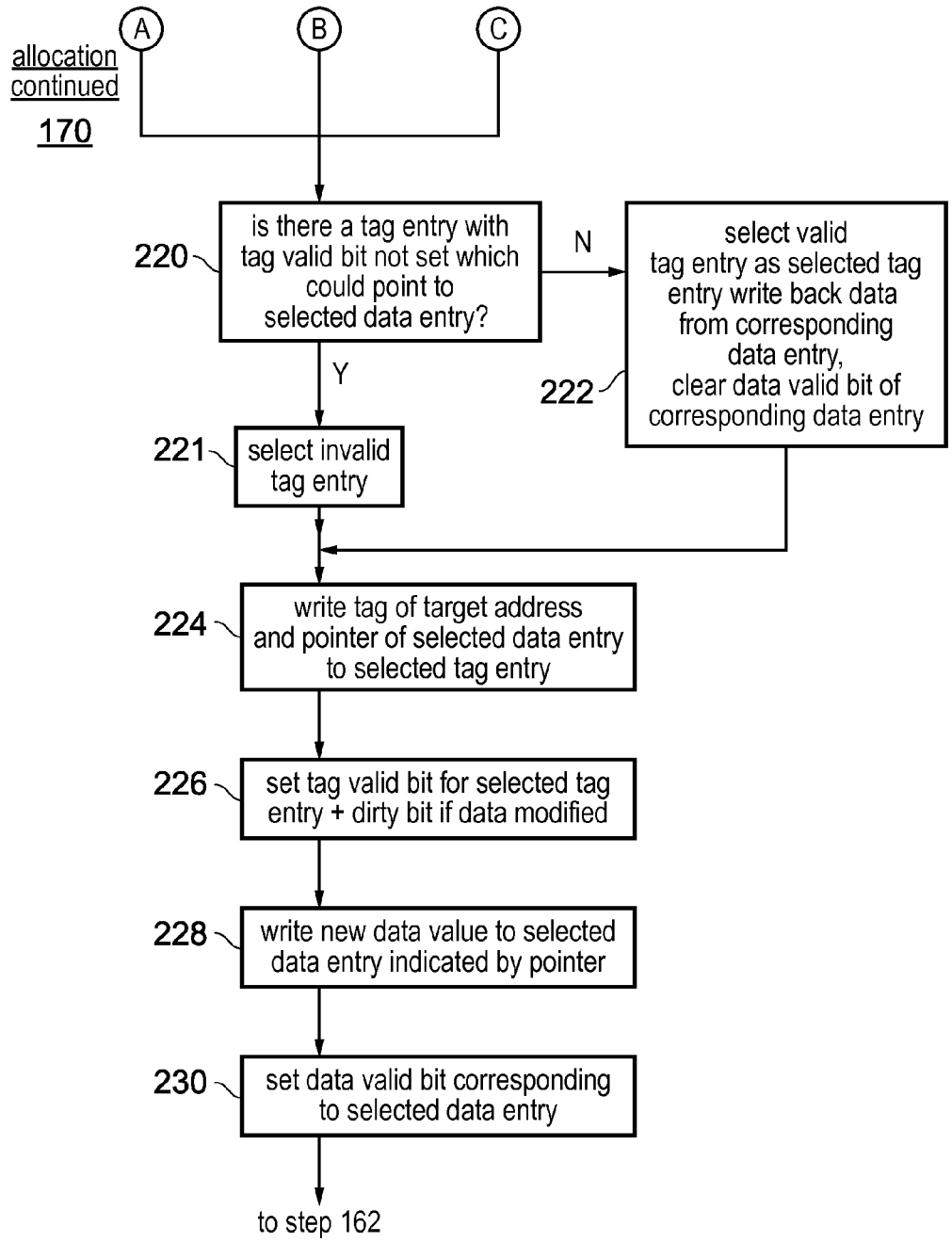
Figure 6A:
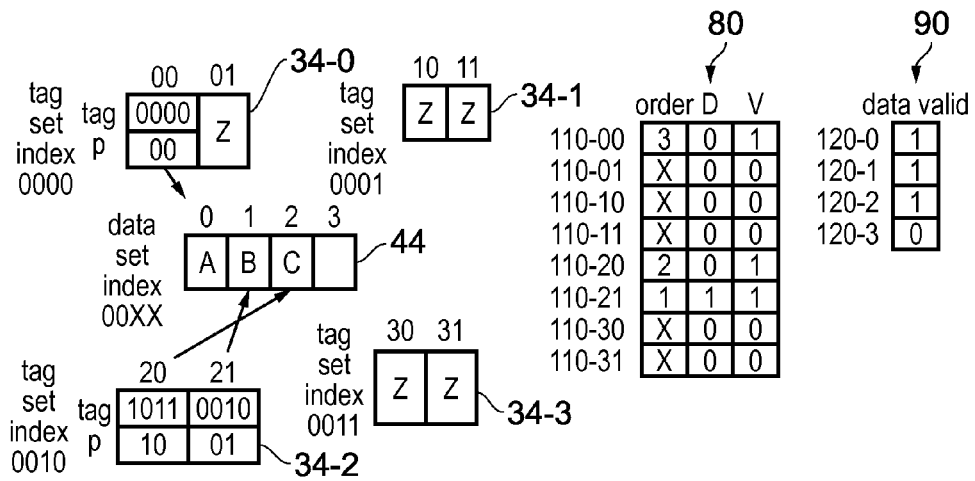
FIG. 6A to 6C show an example of the information stored in data entries, tag entries and victim selection data entries as successive data values are allocated to the data store.
Figure 6B:
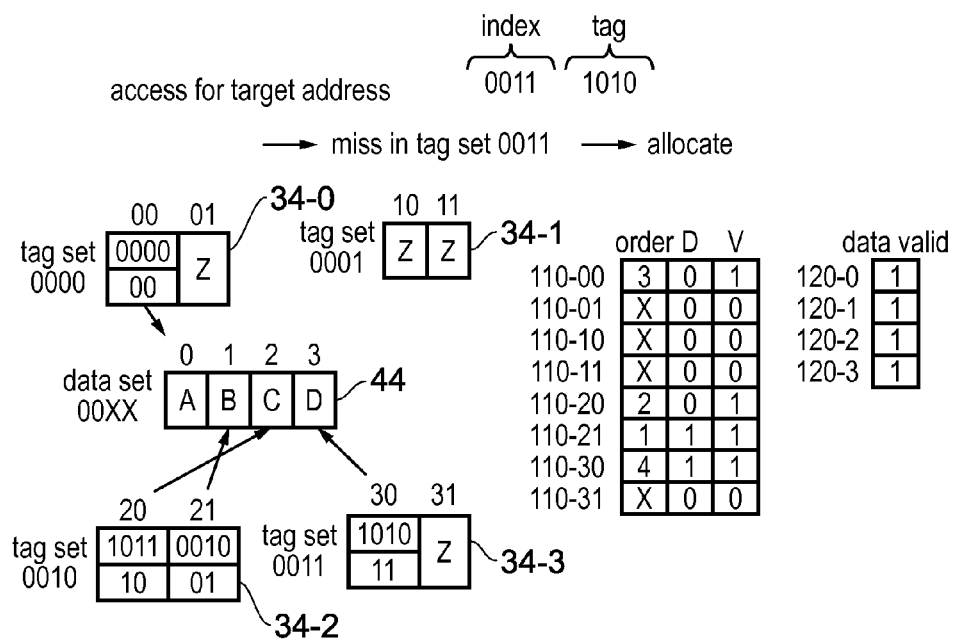
Figure 6C:
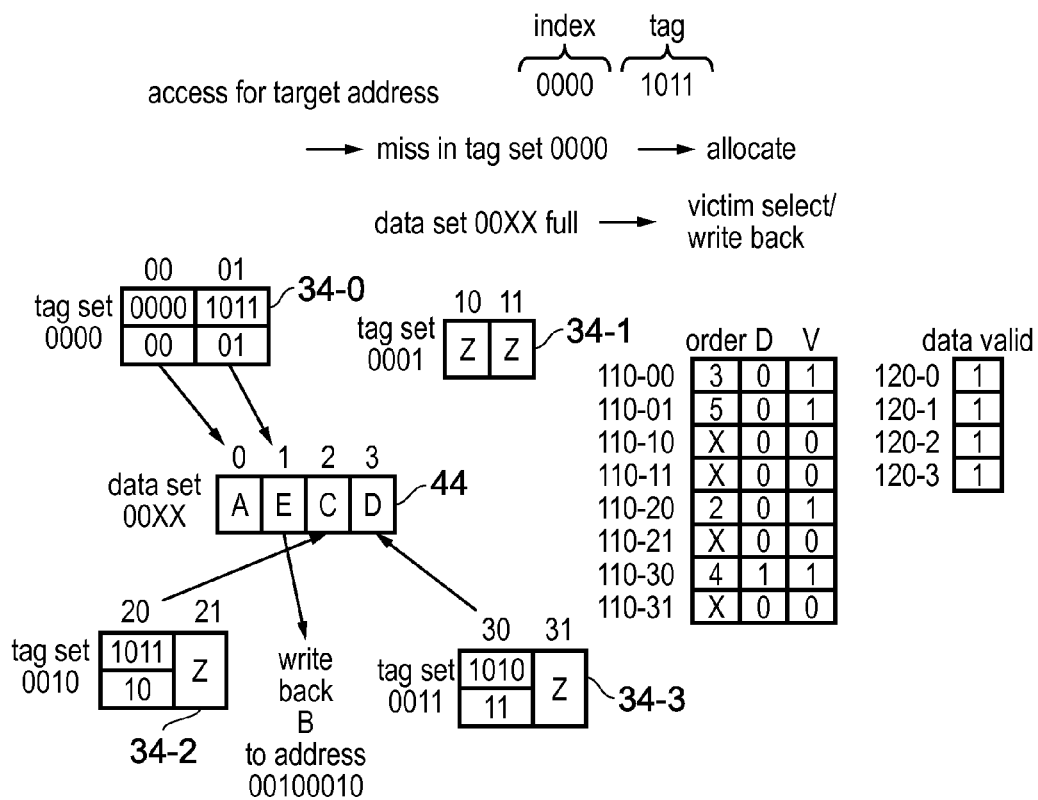

FIG. 6A to 6C show a simplified example of applying the allocation mechanism of FIGS. 5A and 5B to a data store, in which the data array has an associativity of 4 and the tag array has an associativity of 2. In this example, a data set 44 corresponds to addresses with index portion 0b00XX and there are four tag sets 32-0 to 32-3 corresponding to index portions 0b0000, 0b0001, 0b0010 and 0b0011 which can store tag values corresponding to data values in the data set 44. Each tag entry of the tag sets 32-0 to 32-3 has a corresponding tag status information entry 110-00 to 110-31 (the mapping between the tag status information entries and the tag entries is shown in FIG. 6A) and each data entry of the data set 44 has a corresponding data status information entry 120-0 to 120-3.

FIG. 6A shows an example of an initial arrangement of data in the data set 44, tag set 34, tag status information array 80 and data information status array 90. A data access is then received with a target address 0b00111010. The index portion 0b0011 of the target address corresponds to tag set 34-3. The tags are read from this tag set and a tag miss is detected because none of the tags in tag set 34-3 match the tag 0b1010 of the target address (in this case, because all the tag entries of tag set 34-3 are invalid). The tag miss means that an allocation is necessary.

Therefore, the access control circuitry 60 checks whether any data entries of the corresponding data set have their corresponding valid bit clear (step 202 of FIG. 5A). In FIG. 6A, the data status information entry 120-3 has its valid bit equal to 0 (not set) and this indicates that the corresponding data entry 3 of data set 44 is unoccupied. Therefore, this data entry is selected for storing the new data value.

Hence, as shown in FIG. 6B the new data value D is stored to data entry 3 of data set 44. Also, according to steps 220 and 224 of FIG. 5B an empty tag entry of the corresponding tag set 34-3 is selected to store the new tag (in this example entry 30 of tag set 34-3 has been selected). The tag portion 0b1010 of the address of the data value D is stored in the selected tag entry along with the pointer 0b11 identifying that data entry 3 of data set 44 stores the corresponding data value D. Also, FIG. 6B shows that the corresponding tag status information entry 110-30 is updated with new ordering information and the valid bit V of this entry 110-30 is set. The data valid bit in the corresponding data status information entry 120-3 is also updated to indicate valid data. Hence, after the first access, the data in the various arrays is as shown in FIG. 6B.

As shown in FIG. 6C, another access is then received specifying a target address 0b00001011. In this case the index 0b0000 corresponds to tag set 34-0 and again the tag portion 0b1011 of the target address does not match any of the tags in tag set 34-0 (as shown in FIG. 6B, one of the tag stores a different tag value 0b0000 and the other tag of tag set 34-0 is invalid). Therefore there is tag miss and again the allocation procedure of step 170 is required. This time, the corresponding data set 44 for index 0b0000 is completely full with existing data values, as indicated by the fact that all the corresponding data valid bits 120-0 to 120-3 are set. Therefore it is necessary to perform the victim selection algorithm of steps 204 to 216 of FIG. 5A. At step 204 the victim tag entry is selected based on the victim selection data. In this example, a lower ordering value represents a less recently accessed entry than a higher ordering value. Therefore, the tag status information entry 110-21 with the lowest ordering value is selected as a victim tag entry, corresponding to tag entry 21 in tag set 34-2. In other examples, the valid information or the dirty information could have been used when determining the victim tag entry, or another allocation policy could be used.

As the tag set 34-2 containing the victim tag entry is different to tag set 34-0 which was already looked up when determining the tag miss, it is necessary to perform a second tag lookup to read the pointer and tag value from the victim tag entry 21 in tag set 34-2. The pointer 0b01 of this tag entry identifies data location 1 of data set 34, and so data location 1 is selected as selected data entry and the data B from the selected data entry is written back to memory at a write address 0b00100010 determined based on the index 0b0010 corresponding to tag set 34-2 and the tag value 0b0010 in tag entry 21 of tag set 34-2. The valid bit V in tag status information entry 110-21 corresponding to the victim tag entry is now cleared (in FIG. 6C, it has been set to 0).

Then, a tag entry is selected for storing the tag value corresponding to the new data value. As the index portion of the data access was 0b0000, an entry 01 in tag set 34-0 is selected. The tag portion 0b1011 of the target address and a pointer 0b01 of the selected data entry are written to the selected tag entry and the corresponding tag status information entry 110-01 is updated with ordering information and a valid bit set to 1 to indicate that the corresponding tag entry is valid. Then, the new data value E is written to the selected data entry. Hence, the data in the various arrays is now as shown in FIG. 6C.

Hence, as shown in FIG. 6A to FIG. 6C, the victim selection array 72 helps the access control circuitry 60 to keep track of which data values are stored in the data array 44 and which tag values are stored in the tag array 30, and is used for victim selection to try to select for eviction data values which are least likely to be required in future.

Figure 7:
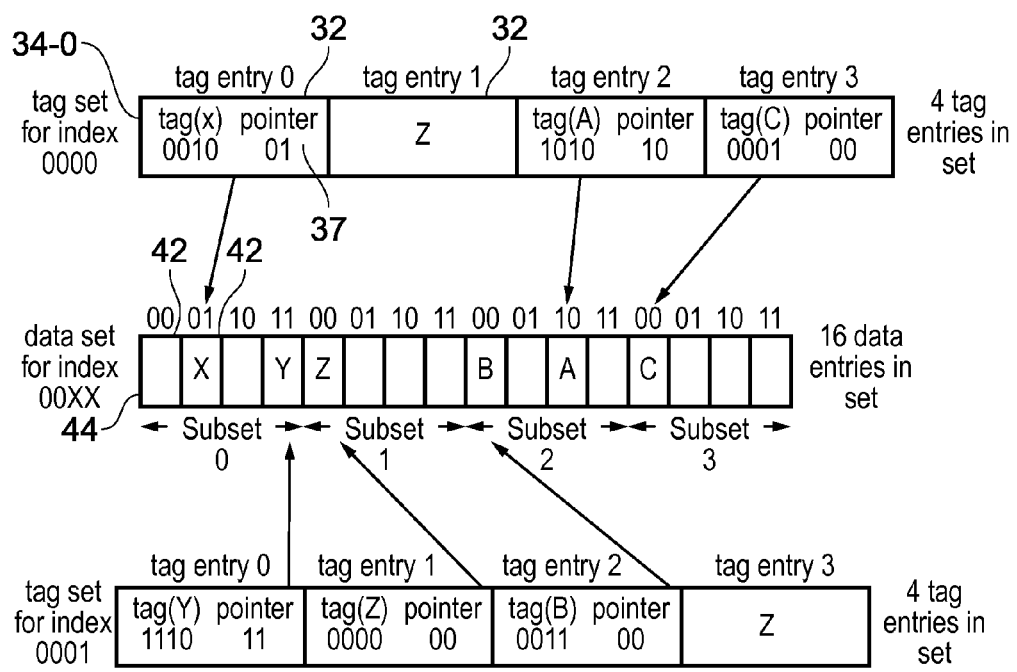
FIG. 7 shows an example implementation in which each tag entry is associated with a subset of data entries of a corresponding data set.

The examples discussed above have allowed each tag entry to point to any of the locations a corresponding data set 44. However, if the data sets are large than this means that the pointer 37 of the tag entry 32 also becomes larger. To save space in the tag array 30 it is possible to provide an embodiment as shown in FIG. 7 in which each tag entry corresponds to a particular subset of the data set. In this example, the data set 44 has 16 entries and each tag entry 32 can point to a subset of 4 data entries 42 of the corresponding data set. For example, in FIG. 7 tag entry 0 of tag sets 34-0 and 34-1 can point to any of four data entries 42 within subset 0 of the data set 44, and tag entries 1, 2 and 3 of each tag set 34-0, 34-1 similarly point to entries in subsets 1, 2 and 3. This means that the pointer 37 can be a two-bit number to identify one of four possible locations, rather than a four-bit number capable of identifying one of 16 locations. This halves the overhead associated with maintaining the pointers 37. While restricting the tag entries to a particular subset of the data set does slightly restrict allocation, it is unlikely that this will affect hit rates significantly. The data values can be allocated to any of the data entries of the data set 44 and so if the corresponding tag entry for a particular subset has already been used then a data entry in a different subset can be selected instead.

If the data set 44 is divided into subsets as shown in FIG. 7, then the method of FIGS. 4 and 5 can be modified slightly. At step 158 the target data entry is identified based on which tag entry included in the matching tag, as well as the index portion of the address and the pointer as discussed before (see the bracketed part of step 158). In this case, the index portion will identify the corresponding data set 44, which tag entry stored the matching tag will identify the subset containing the selected data entry, and the pointer 37 stored in the tag entry will identify the particular data entry within the subset that stores the target data.

Also, if subsets are used as shown in FIG. 7 then at steps 220 to 222 the selected tag entry must be a tag entry which corresponds to the subset that includes the selected data entry. Otherwise, the allocation method would be the same as discussed above.

Figure 8:
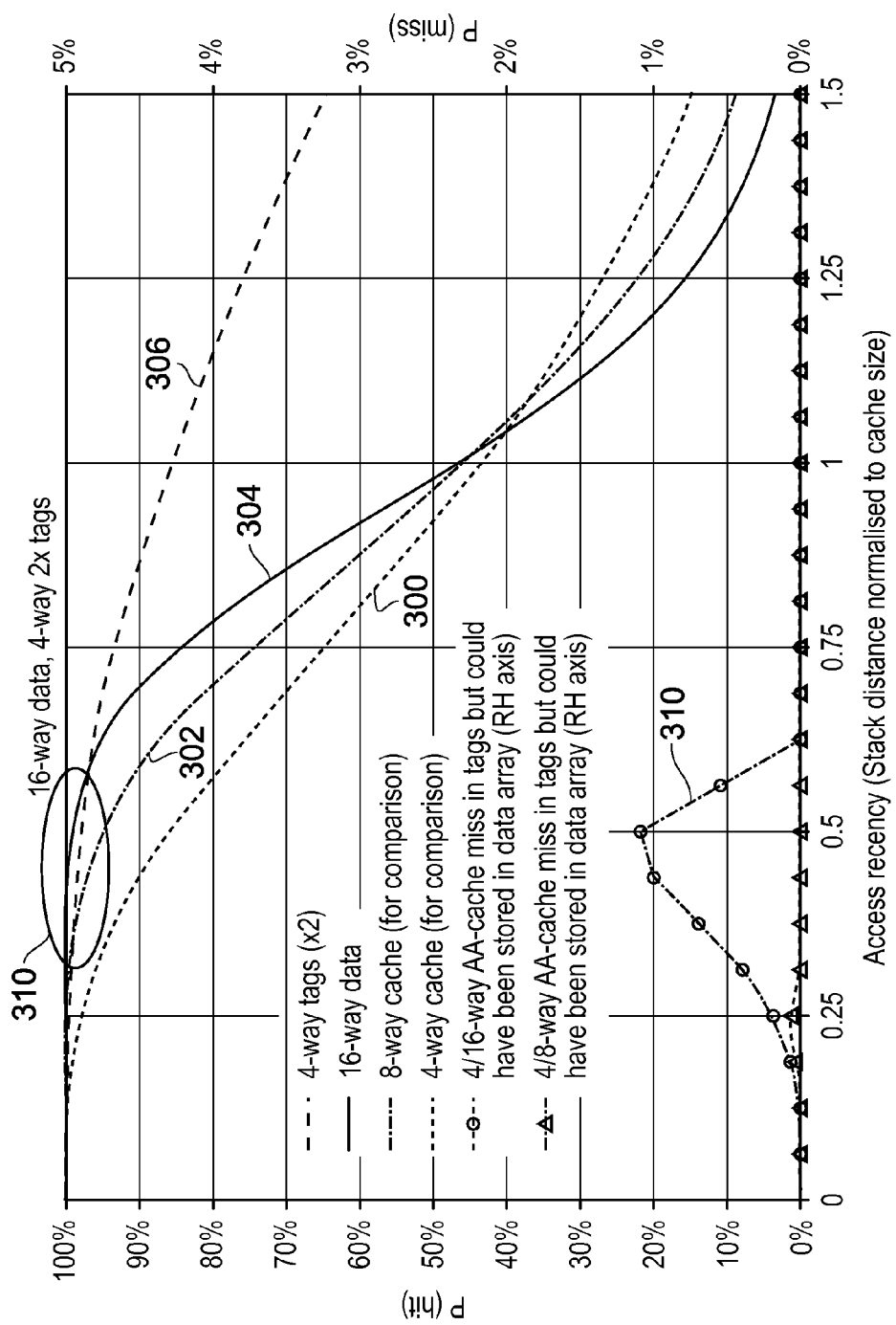
FIG. 8 is a graph comparing performance of a data store having data and tag arrays with different associativity against performance of conventional data stores having data and tag arrays with the same associativity.

FIG. 8 is a graph comparing performance of a cache according to the present technique with performance of conventional caches. The left-hand Y axis represents the cache hit rate while the X axis represents access recency which is represented as stack distance normalised to cache size. The access recency is effectively a measure of the length of time since the previous access to the same data when making another access. As accesses become less recent, it would be expected that hit rate will drop, since it is more likely that the required data has been evicted in the meantime.

The graph includes a line 300 representing a standard 4-way cache and a line 302 representing a standard 8-way cache. In these caches the associativity of tag and data arrays is the same. As shown in the left hand part of FIG. 8, the hit rate is high when data has been accessed relatively recently. As accesses become less frequent, hit rate drops. Line 304 of FIG. 8 shows performance for a 16-way data array. For a standard 16-way cache having the same associativity in the data array and the tag array, the hit rate would be as shown in line 304. As shown in FIG. 8 there is a performance improvement compared to the 4-way and 8-way caches shown in line 300, 302, because allowing more data values corresponding to the same group of addresses to be stored in the cache increases the likelihood that a required data value is present in the cache. However, this increased performance comes at the expense of looking up 16 tag entries on each access, increasing power consumption.

Hence, the present technique provides a tag array with reduced associativity compared to data array. FIG. 8 shows a line 306 representing the hit rate for a 4-way tag array which contains twice as many tag entries as there are data entries in the 16-way data array represented by line 304. A comparison between lines 306 and line 300 shows that providing twice as many tag entries greatly increases the hit rate compared to an array with the same number of tag entries as data entries. By looking up fewer tags on each cache access, power consumption is reduced. However, as each tag value can only be stored in 4 possible locations rather than 16 locations as in the data array, there is a portion of the graph labelled 310 where the hit rate for the tag array 306 drops below the hit rate for the data array 304. This represents occasions when there was space in the data array 40 to store a new data value but there was no space in the corresponding tag set for storing the corresponding tag value and so data had to be evicted from the data array anyway to allow one of the tags to be reallocated. This data-hit/tag-miss condition is shown in more detail in line 310 which is plotted against the right-hand Y axis representing miss rate (rather than hit rate as in the left-hand Y axis). As shown in line 310, for some values of access recency, the data-hit/tag-miss rate value rises to about 1%, but then drops again once the data hit rate begins to lag behind the tag hit rate again due to having fewer data entries. Since the data-hit/tag-miss rate shown in line 310 is still reasonably low, reducing the tag associativity does not significantly affect performance, and the power savings of the reduced associativity justify this small performance penalty.

An estimate of the power saving achieved by the present technique is shown in FIG. 9. Row 350 represents the estimated power consumption of a conventional 16-way cache having a 16-way tag array. Row 360 of FIG. 9 represents a corresponding estimate for an asymmetric associative cache in which the data array has 16-ways while the tag array has 4-ways. As there are more tag sets in the asymmetric cache, there are fewer addresses corresponding to each tag set and so the tag portion stored as the tag value is smaller for the asymmetric cache (18 bits rather than 20 bits), and this compensates for the additional 2 bits required for the pointer (this example uses the technique of FIG. 7 where each tag entry corresponds to a subset of data entries). Therefore, the pointer does not in fact require any additional bits to be stored in each tag entry. The main power saving comes from the fact that many fewer bits need to be read on each tag access (80 bits rather than 320 bits on a tag hit). On a cache miss, some additional bits may sometimes need to be read because a second tag lookup may be required, however the number of tag bits read is still much less than for the conventional cache. As shown in row 370 of table in FIG. 9, the average power saving (assuming 50% hit rate) is 65% of the tag power consumption and 28% of the overall cache power consumption (the power consumption of the data array remains the same). This is a conservative estimate and if the average hit rate is greater than 50% than the savings will be even greater. Also, the power saving would be greater on high-speed RAMs which consume more power than high-density RAMs. Therefore, a significant power reduction can be achieved without greatly affecting performance.

It would be possible to combine the asymmetric associative cache described above with that of a snoop directory to provide a single lookup level 3 cache and snoop filter.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A data store for storing data comprising:
a data array comprising a plurality of data entries for storing data values;
a tag array comprising a plurality of tag entries for storing tag values for tracking which data values are stored in the data array; and
control circuitry configured to control allocation of a data value to said data array and a corresponding tag value to said tag array to:
(a) allocate said data value to a selected data entry of a corresponding data set of N data entries of said data array, where N is an integer which is less than the total number of data entries of said data array, said corresponding data set selected based on an address of said data value, wherein said data value cannot be allocated to a data entry not in said corresponding data set;
(b) allocate said corresponding tag value to a selected tag entry of a corresponding tag set of M tag entries of said tag array, where M is an integer and M<N, said corresponding tag set selected based on said address of said data value, wherein said tag value cannot be allocated to a tag entry not in said corresponding tag set; and
(c) store in said selected tag entry a pointer identifying which data entry of said corresponding data set is said selected data entry,
wherein in response to an access request for accessing from said data array a target data value identified by a target address, said control circuitry is configured to perform a first tag lookup for reading the tag values from each of the corresponding tag set of M tag entries selected based on said target address, and to determine whether the data array stores said target data value by comparing a tag portion of the target address with each of said read tag values,
when none of the read tag values corresponds to said tag portion of said target address, then said control circuitry is configured to perform said allocation for allocating said target data value to said data array and said tag portion of said target address to said tag array, and
said selected data entry already stores a data value which needs to be written back to memory and the tag entry corresponding to the data value already stored in said selected data entry is from a different tag set to the tag set read in said first tag lookup, then said control circuitry is configured to perform a second tag lookup for said different tag set to read the tag value corresponding to said data value already stored in said selected data entry.

2. The data store according to claim 1, wherein said tag array comprises Y tag sets of M tag entries, and said data array comprises Z data sets of N data entries, where Y and Z are integers and Y>Z.

3. The data store according to claim 2, wherein (Y×M)≥(Z×N).

4. The data store according to claim 3, wherein (Y×M)=(Z×N)×$2^J$, where J is an integer.

5. The data store according to claim 1, wherein when one of the read tag values corresponds to said tag portion of said target address, then said control circuitry is configured to determine a target data entry in said data array using at least a portion of said target address and said pointer of the tag entry storing said one of the read tag values, and to access said target data value in said target data entry.

6. The data store according to claim 5, wherein said control circuitry is configured to access said target data value in said target data entry in a processing cycle following the processing cycle in which said first tag lookup is performed.

7. The data store according to claim 1, wherein said control circuitry is configured to perform victim selection for selecting which of said corresponding data set of N data entries is said selected data entry.

8. The data store according to claim 7, comprising a victim selection data array comprising a plurality of victim selection entries for storing victim selection data for corresponding data entries of said data array;
wherein said control circuitry is configured to perform said victim selection using the victim selection data of a set of victim selection entries corresponding to said corresponding data set of N data entries.

9. The data store according to claim 8, wherein said victim selection data comprises information for estimating which of said corresponding data set of N data entries has been least recently used.

10. The data store according to claim 7, wherein said control circuitry is configured to perform said victim selection using invalid tag values stored in tag entries of said tag array, said invalid tag values comprising tag values which do not correspond to valid data values in said data array.

11. The data store according to claim 7, wherein in said victim selection, said control circuitry is configured to select a tag entry of said corresponding tag set as said selected tag entry and to select, as said selected data entry, the data entry of said corresponding data set which is identified by a pointer already stored in said selected tag entry.

12. The data store according to claim 11, wherein when said selected data entry already stores a data value which is to be written back to memory, then said control circuitry is configured to determine the address to which the data value is to be written back from a tag value already stored in said selected tag entry.

13. The data store according to claim 1, wherein each tag entry of said corresponding tag set corresponds to a subset of the data entries of said corresponding data set.

14. The data store according to claim 13, wherein said pointer stored in said selected tag entry identifies which data entry of the corresponding subset of data entries is said selected data entry.

15. The data store according to claim 1, wherein said control circuitry is configured to select said corresponding data set based on a first hash function applied to a first portion of said address, and to select said corresponding tag set based on a second hash function applied to a second portion of said address.

16. The data store according to claim 1, comprising:
a data valid information array configured to store data valid information indicating whether corresponding data entries of the data array store valid data values; and
a tag valid information array configured to store tag valid information indicating whether corresponding tag entries of the tag array stores tag values corresponding to valid data values in the data array.

17. A data store for storing data comprising:
data array means for storing data, comprising a plurality of data entry means for storing data values;
tag array means for storing tags, comprising a plurality of tag entry means for storing tag values for tracking which data values are stored in the data array means; and
control means for controlling allocation of a data value to said data array means and a corresponding tag value to said tag array means to:
(a) allocate said data value to a selected data entry means of a corresponding data set of N data entry means of said data array means, where N is an integer which is less than the total number of data entry means of said data array means, said corresponding data set selected based on an address of said data value, wherein said data value cannot be allocated to a data entry means not in said corresponding data set;
(b) allocate said corresponding tag value to a selected tag entry means of a corresponding tag set of M tag entry means of said tag array means, where M is an integer and M<N, said corresponding tag set selected based on said address of said data value, wherein said tag value cannot be allocated to a tag entry means not in said corresponding tag set; and
(c) store in said selected tag entry means a pointer identifying which data entry means of said corresponding data set is said selected data entry means,
wherein in response to an access request for accessing from said data array means a target data value identified by a target address, said control means is configured to perform a first tag lookup for reading the tag values from each of the corresponding tag set of M tag entry means selected based on said target address, and to determine whether the data array means stores said target data value by comparing a tag portion of the target address with each of said read tag values,
when none of the read tag values corresponds to said tag portion of said target address, then said control means is configured to perform said allocation for allocating said target data value to said data array means and said tag portion of said target address to said tag array means, and
said selected data entry means already stores a data value which needs to be written back to memory and the tag entry means corresponding to the data value already stored in said selected data entry is from a different tag set to the tag set read in said first tag lookup, then said control means is configured perform a second tag lookup for said different tag set to read the tag value corresponding to said data value already stored in said selected data entry means.

18. A method of allocating a data value to a data store comprising a data array comprising a plurality of data entries for storing data values and a tag array comprising a plurality of tag entries for storing tag values for tracking which data values are stored in the data array; the method comprising:
in response to an access request for accessing from said data array a target data value identified by a target address, performing a first tag lookup for reading the tag values from each of a corresponding tag set of M tag entries selected based on said target address, where M is an integer, and determining whether the data array stores said target data value by comparing a tag portion of the target address with each of said read tag values, and
when none of the read tag values corresponds to said tag portion of said target address:
allocating said target data value to a selected data entry of a corresponding data set of N data entries of said data array, where N is an integer which is less than the total number of data entries of said data array and M<N, and said corresponding data set is selected based on said target address of said target data value, wherein said target data value cannot be allocated to a data entry not in said corresponding data set;
allocating said tag portion of the target address to a selected tag entry of the corresponding tag set of M tag entries of said tag array, where said corresponding tag set is selected based on said target address of said target data value, wherein said tag value cannot be allocated to a tag entry not in said corresponding tag set; and
storing in said selected tag entry a pointer identifying which data entry of said corresponding data set is said selected data entry,
wherein when said selected data entry already stores a data value which needs to be written back to memory and the tag entry corresponding to the data value already stored in said selected data entry is from a different tag set to the tag set read in said first tag lookup, a second tag lookup is performed for said different tag set to read the tag value corresponding to said data value already stored in said selected data entry.

* * * * *